United States Patent [19]

Wolf

[11] 4,291,751

[45] Sep. 29, 1981

[54] THERMAL INVERTER

[76] Inventor: Bernard A. Wolf, 6514 Central Ave., St. Petersburg, Fla. 33707

[21] Appl. No.: 66,921

[22] Filed: Aug. 16, 1979

[51] Int. Cl.$^3$ ...................... F25D 23/12; F23L 17/02
[52] U.S. Cl. ...................................... 165/45; 62/260; 98/70; 165/179; 165/185
[58] Field of Search ................ 165/45, 179, 185, 154, 165/164; 62/260; 98/70, 72, 32

[56] References Cited

U.S. PATENT DOCUMENTS

| | | | |
|---|---|---|---|
| 1,297,633 | 3/1919 | Ashley | 62/260 |
| 1,382,736 | 6/1921 | Mitchell | 98/70 |
| 2,007,406 | 7/1935 | Miller | 165/45 |
| 2,178,176 | 10/1939 | Lamm | 165/45 |
| 2,217,190 | 10/1940 | Urquhart | 165/45 |
| 2,424,612 | 7/1947 | Gunter | 165/179 |
| 2,428,876 | 10/1947 | Hawkins | 165/45 |
| 2,554,661 | 5/1951 | Clancy | 165/45 |
| 2,793,509 | 5/1957 | Keen | 62/260 |
| 2,858,115 | 10/1958 | Stebbins | 165/179 |
| 3,102,532 | 9/1963 | Shoemaker | 165/45 |
| 3,740,967 | 6/1973 | Huelle | 165/179 |
| 3,809,149 | 5/1974 | Deutsch | 62/260 |
| 3,970,140 | 7/1976 | Heller | 165/45 |
| 4,139,321 | 2/1979 | Werner | 165/45 |

FOREIGN PATENT DOCUMENTS

| | | | |
|---|---|---|---|
| 2407438 | 6/1979 | France | 126/450 |
| 480892 | 11/1975 | U.S.S.R. | 165/45 |

Primary Examiner—Daniel J. O'Connor
Attorney, Agent, or Firm—William A. Newton

[57] ABSTRACT

Disclosed is a thermal inverter arrangement and method for controlling air temperatures and currents within a building utilizing an underground plenum chamber having a plurality of transverse screens with thermal conducting poles attached thereto. Through the use of thermal differentials and an exhaust duct cooperatively aligned to receive favorable outside winds, natural air movements create a continuous draft from outside the building, through the plenum chamber, then through the building, and back outside again through the exhaust duct.

4 Claims, 3 Drawing Figures

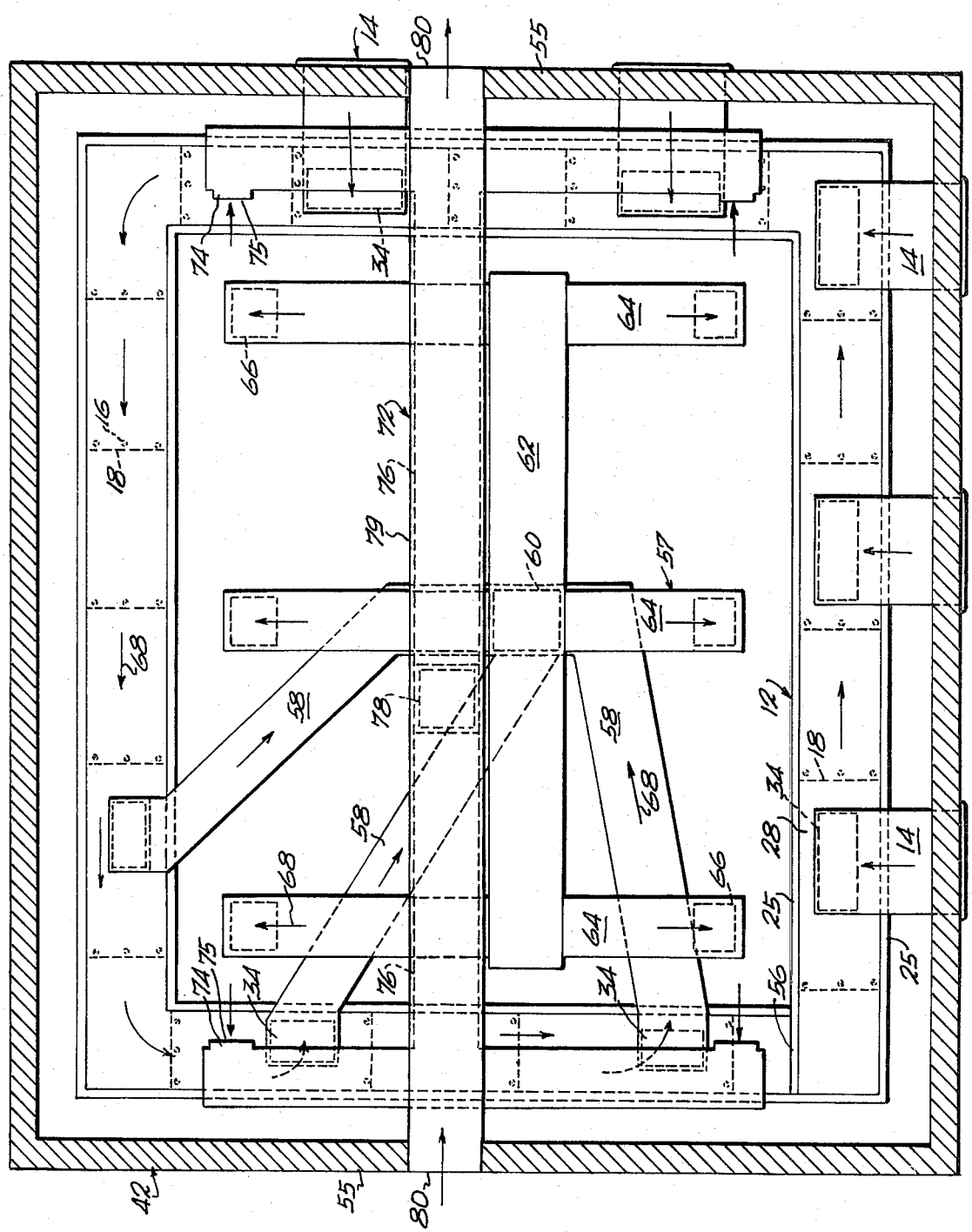

THERMAL INVERTER

FIELD OF THE INVENTION

The present invention relates to systems for regulating the temperature of a building utilizing thermal heat transfer to and from natural elements of the earth.

DESCRIPTION OF THE PRIOR ART

There are several prior art arrangements wherein pipes and like conduit means are disposed underground in water or earth and are used for transporting an air flow to be cooled by the earth or water. These conduits generally impede air flow to a sufficient degree that fans and like means must be used to create an air movement therethrough. The temperature controlling capacities of these prior art systems are generally very limited, with the systems normally only being used for cooling air, and then only in very limited quantities to temperatures that vary or are in an undesirable temperature range.

Accordingly, it can be readily seen that there is a need for an air controlling system capable of regulating temperatures within a building, by both heating and cooling outside air on a year around basis, to achieve a desired, relatively constant temperature range corresponding to temperatures found at selected depths of the earth; capable of having sufficient temperature regulating capacity for the entire building independent of any other assistance and capable of natural air movement without the use of fans and like mechanical means.

SUMMARY OF THE INVENTION

The present invention is directed toward a thermal inverter arrangement and method for controlling air temperatures and currents within a dwelling, building or like structure by using natural elements. The thermal inverter arrangement comprises a plenum chamber disposed underground and having therein a plurality of traversely disposed screens, with each screen being in thermal conducting contact with at least one pole which protrudes into the depths of the earth. The plenum chamber is interconnected with a duct distribution system for delivering the temperature controlled air into the building's interior. Simultaneously, an exhaust system, having an exhaust duct aligned for receiving favorable outside winds, creates a continuous draft from the outside through the plenum chamber and then the dwelling back to the outside. At the same time, the temperature differential between the outside air and temperature controlled air of the plenum chamber assists in creating and maintaining the natural air movement through the plenum chamber. By virtue of this arrangement, the air flow into the dwelling or building is substantially maintained at the desired temperatures of the earth at the selected depths of the poles. The optimum depths that can be achieved by use of the poles generally provide relatively consistent year-around range of temperatures in most geographical areas.

BRIEF DESCRIPTION OF THE DRAWINGS

Further objects and advantages of the present invention will become apparent as the following description proceeds, taken in conjunction with the accompanying drawings in which:

FIG. 3 is a plan, top view of the building of FIG. 2 wherein the building's roof, the building's floor and the top of the phenum chamber are not shown for the sake of clarity.

DETAILED DESCRIPTION OF PREFERRED EMBODIMENT

Figure 1:
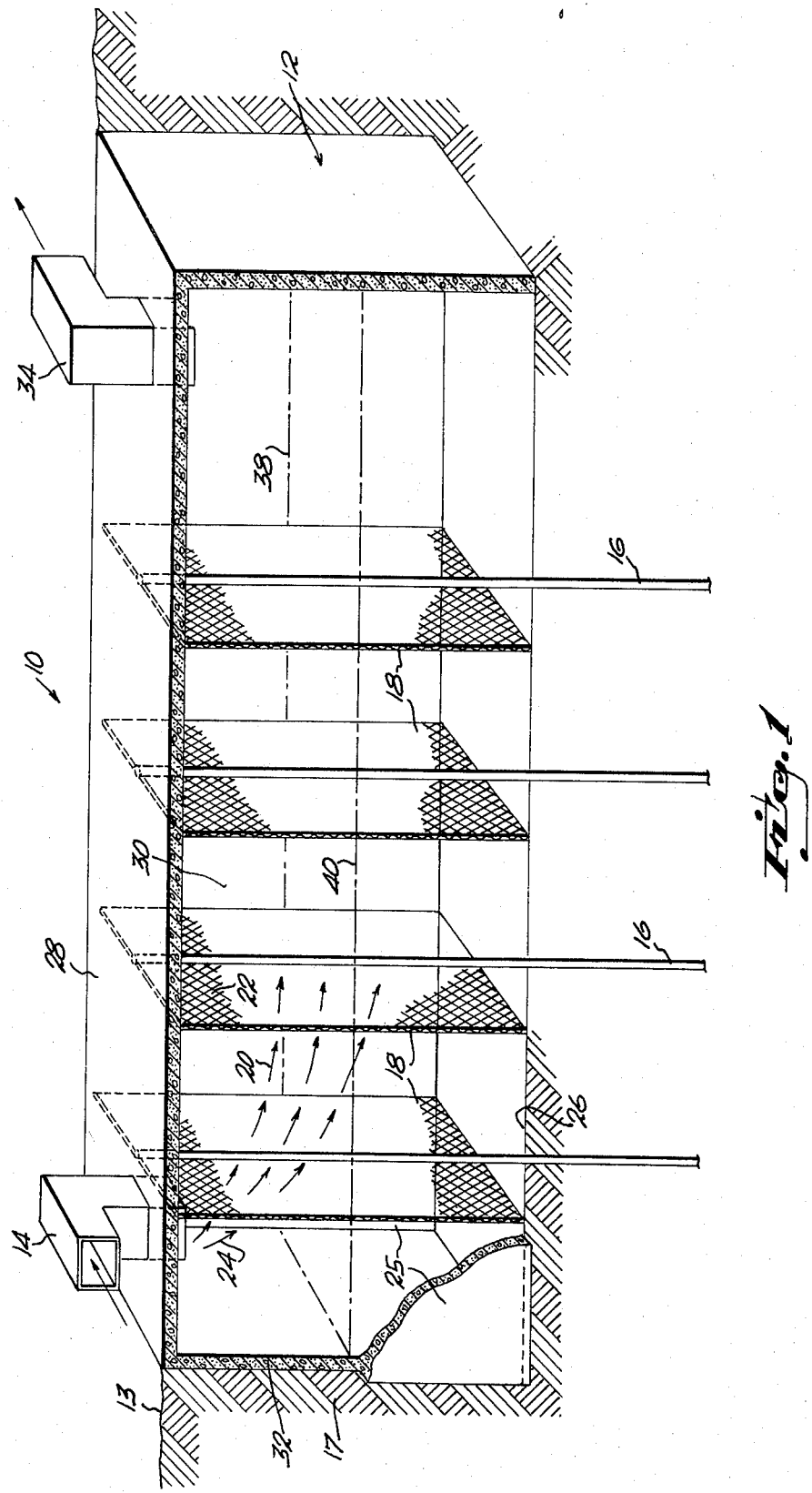
FIG. 1 is a partially broken away, perspective view of the phenum chamber with one sidewall partially broken away.

Referring to FIG. 1, there is disclosed a thermal inverter arrangement, generally indicated by numeral 10, and method for controlling air temperatures and currents for the purpose of cooling and heating a dwelling or building by utilizing natural elements. The thermal inverter arrangement 10 includes a plenum chamber 12, which is only shown in a partially broken-away view of FIG. 1. The plenum chamber 12 is disposed underground below ground level 13 and preferably below the building to be cooled. In general, the plenum chamber 12 receives ambient air from outside of the building and the plenum chamber 12 through a plurality of air inlets. Inside plenum chamber 12, a plurality of poles 16, preferably formed of aluminum, are positioned several feet into the earth 17 below the plenum chamber 12. These poles 16 are extended upward across the entire depth and width of the plenum chamber 12. A plurality of spaced-apart screens 18, ideally formed of aluminum, are mounted in traversing relationship along the plenum chamber 12 and are disposed to intercept and traverse an air flow 20, although only one pole 16 is shown for each screen 18, it is contemplated that a plurality of poles 16 for each screen 18 will be used in actual practice. The air forming the air flow 20 originates from the air inlets 14. The screens 18 have formed therein a plurality of openings 22, with each opening 22 preferably having a diamond shaped configuration. The openings 22 have a center axis which are disposed on a slight downward angle, similar to a wire lath, which permits the air flow 20 to pass therethrough with a downward projection, such as illustrated at location 24. This arrangement of the screen 22 helps to distribute the air flow 20 across the entire cross-sectional width and depth dimensions of the plenum chamber 12. The plenum chamber 12 of the preferred embodiment is formed by a pair of opposed concrete side walls 25, a bottom 26 formed by the earth 17, and a concrete top 28. It should be appreciated that in some geographical areas, the water table for the area is above the floor of the plenum chamber 12. Even in this situation it has been found generally desirable to extend the screen 18 into the free standing water. To increase conductivity of heat and to minimize corrosion, the aluminum poles 16 and the aluminum screens 18 can be "black anodized" in a manner well known. The plenum chamber 12 can be made of any suitable material that is capable of providing the structural support necessary for maintaining a relatively large cavity 30 formed therein within the confines and pressures of the surrounding earth. In the preferred embodiment, the plenum chamber 12 is constructed of conventional concrete materials. However, it should be appreciated that the thermal transfer necessary for the present invention does not occur through the concrete walls 32 of the plenum chamber 12. Hence, the thermal conductivity of the walls 32 of the plenum chamber 12 can be poor. Moreover, it is preferable, although not necessary, in many geographical areas for the walls 32 to be poor thermal conductors, such as with the concrete walls 32, since the temperature level of the earth at the depth of the plenum chamber 12 may exceed the desired temperature level. A plurality of air outlets 34 are provided for the air to exit from the plenum chamber 12; thereby creating a continuous flow of air therethrough. Moreover, assuming the water level does not substantially impair the air flow 20, the plenum chamber 12 need not be formed of a water sealant substance.

Referring to FIG. 1, an air flow 20 enters through the air inlets 14, spreads out and passes through the openings 22 of the screen 18, and exits through the air outlets 34. A thermal transfer occurs between the screens 18 and the air flow 20 so that the air flow substantially achieves the same temperature as the screens 18, after having passed through the plenum chamber 12. More specifically, in most geographical areas, an optimum temperature can be found by coring the property upon which the building is to be constructed. Moreover, it is desirable to select a depth having a temperature that will remain fairly constant all year long. For example, in some geographical areas, some depths below the frost line, maintain a given temperature. It should be appreciated that it is desirable in the building to control the temperature throughout the year. Hence, when it is cold, heating will be desired and when it is hot, cooling will be desired. Therefore, a proper depth is established for the desired temperature. This temperature, although it may fluctuate slightly through the year, will provide a fairly constant base temperature for the thermal transfer of the present invention. Hence, heat is transferred up the poles 16 when heating the air, or down the poles 16 when cooling the air. If only the cooling or only the heating capacity of the present invention is desired, the disclosed system can be readily adapted to be operational only during selected seasons by the inclusion of dampers (not shown) for closing off the air inlets 14 or air outlets 34.

Referring to FIG. 1, in operation, the air flow 20, passing through the screens 18, will, for example during the hot season, transfer its heat to the screens 18, which in turn will transfer the heat into thepoles 16 so that the heat is dissipated into the earth 17. The air will assume the average temperature of the earth 17 at the range of depth of the poles 16. On the other hand, should the air introduced from the outside be colder than the temperature of the screens 18, such as during the cold season, then the air will be warmed to the average temperature of the earth 17 at the depths of the poles 16. Hence, whether the outside air is cold or hot, the resulting air passing through the plenum chamber 12 will assume a desired temperature range of the earth at the depths of the poles 16. This provides conditioned air for distribution within the house or building, as will be disclosed hereinafter.

With reference to FIG. 1, the total volume of the cavity 30, contained within the plenum chamber 12, will be determined primarily by the volume of the space subjected to temperature control within the building, the temperature differential between the desired and actual temperature, and the probable natural rate of air movement created by this temperature differential. Generally, the volume of cavity 30 must be at least 25 percent of the volume of the temperature controlled space of the building.

As previously described, the water level, as illustrated by numeral 38 in FIG. 1, may exceed the depth of the bottom 26 of the plenum chamber 12 in certain geographical areas, for at least portions of the year. Consequently, the plenum chamber 12 should in these regions be of sufficient interior volume to compensate for standing water, such as the standing water illustrated by numeral 40 in FIG. 1. In the preferred embodiment, the concrete walls 32 lead to moisture seepage that creates the standing water 40. In such a situation, the standing water 40, along with the poles 16, will assume the temperature of the poles 16. As is well known, water, which conducts heat at a relatively slow rate, would normally form a thermal barrier (i.e., a substantial temperature gradient) between air and the ground. However, the use of the screens 18 and poles 16 overcomes this thermal barrier problem. It will be obvious to those skilled in the art that in those geographical locations where the water level is sufficiently high to substantially reduce the volume of cavity 30, the plenum chamber 12 can be modified to include a floor (not shown), with the entire enclosure having a water sealant layer. Additionally, periodic pumping might prove desirable for removing quantities of water created by minute moisture seepage occuring over a period of time.

Figure 2:
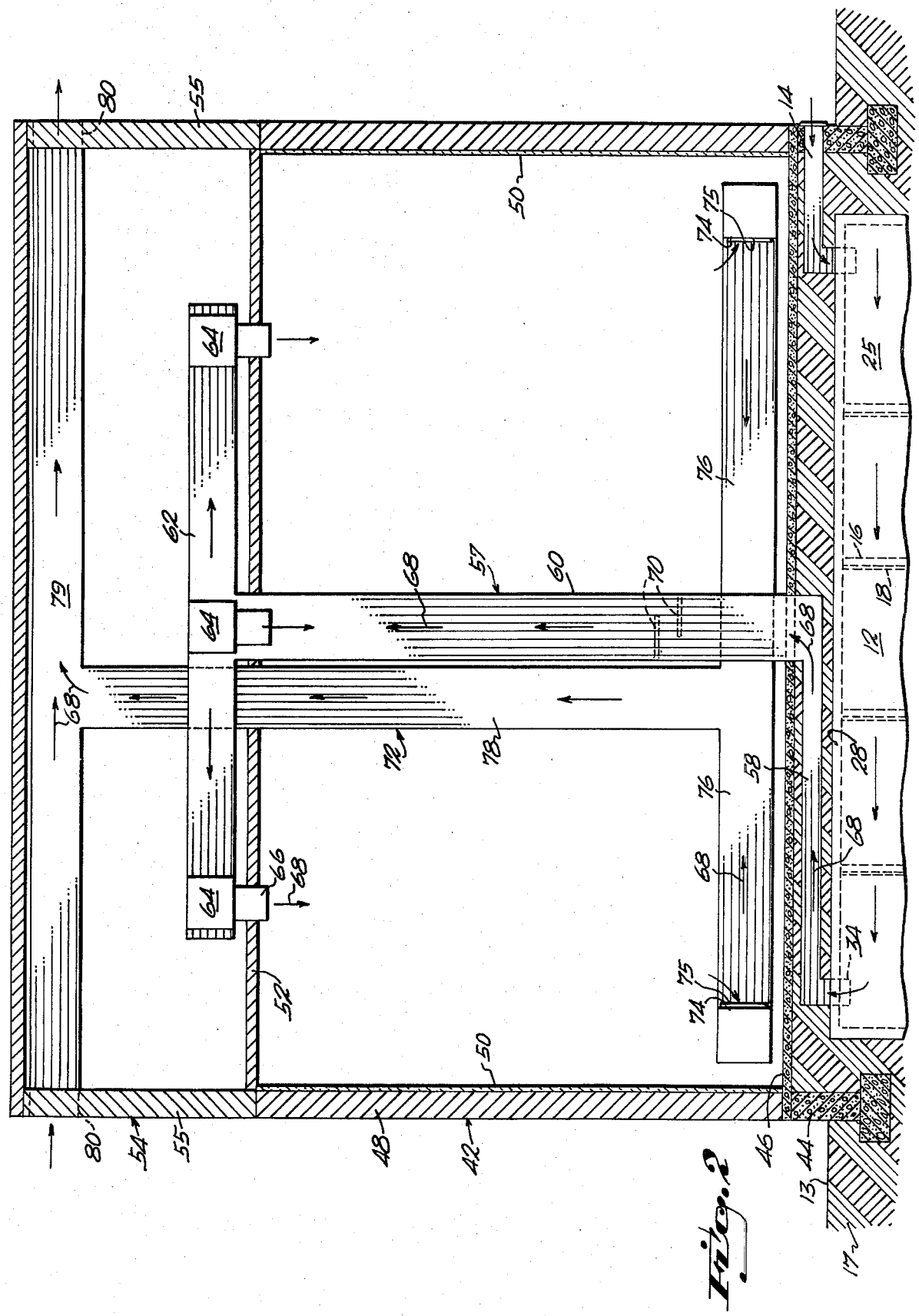
FIG. 2 is a plan, side view of a building incorporating the plenum chamber.

The incorporation of the thermal inverter arrangement 10 into an examplary house 42 is illustrated in FIGS. 2 and 3. Referring to FIG. 2, the house 42 is shown with a foundation 44 which supports a floor 46 and walls 48. Ideally, to make the system more efficient, suitable insulation 50 is included in the walls 48. Above the walls 48 is normal ceiling 52 and a gabled roof 54, having a pair of gabled ends 55. Beneath the floor 46 is a normal back fill which covers the plenum chamber 12. The plenum chamber 12 ideally has a rectangular configuration to conform to the perimeter of the house 42 and to allow the same to be built into the foundation 44. A termination wall 56 is interposed in traversing relationship in the plenum chamber 12 to prevent circulation of air therein.

As depicted in FIGS. 2 and 3, starting adjacent to one side of the termination wall 56, a plurality of air inlets 14 are successively mounted in fluid communication with the plenum chamber 12. Starting adjacent to the other side of the termination wall 56, a plurality of air outlets 34 are successively mounted in fluid cmmunication with the plenum chamber 12. By virtue of this arrangement, the air flow 20 proceeds through a sufficient number of the screens 18. For the sake of clarity, only one air outlet 34 and one air inlet 14 are shown in FIG. 2, whereas in actual practice it may be desirable to have several of each, as illustrated in FIG. 3. The air from the air outlet is distributed through the house by a duct distribution system 57. Each air inlet 14 is fluidly connected by a horizontally disposed duct 58 to a centrally disposed, vertically aligned main duct 60. The main duct 60 joins with a horizontally disposed distribution duct 62 which distributes the temperature controlled air to a plurality of feeder ducts 64, with each duct 64 having a room outlet 66. The flow of air is shown by arrows 68. Optionally, a plurality of offset, spaced apart diatomic filters 70 may be inserted into the main duct 60 to insure the removal of moisture and odors from the temperature controlled air being distributed throughout the house 42. However, care must be take in positioning the conventional diatomic filters 70 so as not to produce a substantial air flow impediment. Diatomic filters have the capability of absorbing odors, moisture and holding moisture up to four times its own weight. Hence, by virtue of this duct distribution system 57, conditioned, temperature controlled air is distributed down through the ceiling 52 of the house 42. However, it should be a appreciated that any arrangement of ducts which does not substantially impede the air flow can be used to distribute the air.

Referring to FIGS. 2 and 3, there is illustrated a duct exhaust system 72 for removing air from the house 42. The duct exhaust system 72 includes a plurality of floor ducts 74, having floor inlets 75, joined by an exhaust feeder duct 76. The feeder duct 76 connects with a vertically disposed, main exhaust duct 78. It should be appreciated that many arrangements of exhaust ducts for a given house will be obvious to those skilled in the art and the specific arrangement of ducts is per se not part of the present invention.

A unique feature of the present invention is the providing of an exhaust duct 79, which is vertically disposed in the roof of the house 42 and cooperatively aligned to receive favorable winds. In the illustrated example of the gabled house 42, the exhaust duct is parallel to the peak of the gabled roof, with one end 80 thereof disposed in each gabled end 55. The natural air currents, provided by favorable winds, generally favor one direction or other. Hence, the air currents proceed from the outside, through the exhaust duct 79, and back outside again. In so doing, a draft is produced in the main exhaust duct 78 that removes air from the interior of the house 42. For this draft to create a further air movement in the plenum chamber 12, the remainder of the house must be sealed to prevent other inlets.

With reference to FIGS. 2 and 3, the difference in thermal temperature of the outside air and the inside, temperature controlled air creates a natural air movement, as illustrated by the arrows 68. As is well known, hot air tends to rise and cool air tends to fall. Using this effect, in combination with the draft created by the exhaust duct 79, a continuous draft proceeds from outside the building, through the rooms of the house 42, and through the exhaust duct 79 in the roof 54. The volume of air moved is determined by the draft created through the exhaust duct 79. Hence, the air in the house 42 is substantially maintained at the desired temperatures of the earth at selected levels. This method of conditioning air is greatly improved by thoroughly insulating the house 42 in well known ways to prevent the outside, above-ground temperature from penetrating the walls, ceiling and floors.

It should be appreciated that where inadequate duct systems are provided that produce excessive air impedance, fans and like means can be used to create the necessary air movement through the plenum chamber 12. In the embodiment of FIG. 3, the plenum chamber 12 could have a cross-sectional area approaching 32 square feet. Hence, the present invention contemplates using a very sizable cavity 30.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A thermal inverter arrangement for year around regulating air temperatures of a building's interior by utilizing earth temperatures at predetermined depths below the earth's surface whereat a selected temperature range exits substantially year around, the thermal inverter arrangement comprising:
    a plenum chamber adapted for being disposed underground;
    said plenum chamber having an air inlet and an air outlet;
    said plenum chamber having a plurality of metal screens disposed in traversing relationship to said plenum chamber between said air inlet and said air outlet;
    a plurality of metal poles being mounted to each of the screens and positioned to extend downward from said screen to said predetermined depths;
    said plenum chamber being constructed below the foundation of the house;
    an exhaust duct mounted in the upper portions of the building having a pair of opposed ends disposed in fluid communication with the outside region with respect to the building;
    a main duct having one end thereof opening into the interior of the building and the other end joining said exhaust pipe; whereby a draft is created through the main duct by natural air currents flowing through the exhaust duct;
    said plenum chamber defining an interior cavity having a volume at least equal to one-fourth of the volume of the interior of the building to be cooled; whereby the air flowing through the plenum chamber, by thermal heat transfer between the air flow and the predetermined depths of the earth through said screens and poles, assumes desired temperatures.

2. In the thermal inverter arrangement of claim 1, each of said screens and poles being formed of aluminum and being black anodized for increased conductivity of heat.

3. In the thermal inverter arrangement of claim 1, said screen having diamond-shape openings, said openings each having a center axis disposed at a slight downward angle with respect to the horizontal.

4. In the thermal inverter arrangement of claim 1, said plenum chamber having a configuration conforming to the foundation of the building.

* * * * *